(12) United States Patent
Schoenberg

(10) Patent No.: US 9,400,204 B2
(45) Date of Patent: Jul. 26, 2016

(54) FUEL LEVEL SENSOR

(71) Applicant: Gregory B. Schoenberg, St. Louis, MO (US)

(72) Inventor: Gregory B. Schoenberg, St. Louis, MO (US)

(*) Notice: Subject to any disclaimer, the term of this patent is extended or adjusted under 35 U.S.C. 154(b) by 342 days.

(21) Appl. No.: 13/799,551

(22) Filed: Mar. 13, 2013

(65) Prior Publication Data

US 2014/0260520 A1 Sep. 18, 2014

(51) Int. Cl.
*G01F 19/00* (2006.01)
*G01F 23/00* (2006.01)
*G01F 25/00* (2006.01)
*G01F 23/24* (2006.01)

(52) U.S. Cl.
CPC .......... *G01F 25/0061* (2013.01); *G01F 23/246* (2013.01); *G01F 23/248* (2013.01)

(58) Field of Classification Search
CPC ... G01F 23/00; G01F 25/0061; G01F 23/266; G01F 25/0084; G01F 23/248; G01F 23/246; G01F 23/247; G01F 23/22
USPC ...................................... 73/295, 290 R, 1.73
See application file for complete search history.

(56) References Cited

U.S. PATENT DOCUMENTS

| | | | | |
|---|---|---|---|---|
| 3,111,031 | A | * | 11/1963 | Kuritza ................. G01F 23/247 340/870.17 |
| 5,577,837 | A | * | 11/1996 | Martin et al. ................. 366/145 |
| 6,546,796 | B2 | * | 4/2003 | Zimmermann et al. ........ 73/295 |
| 6,615,658 | B2 | * | 9/2003 | Snelling .......................... 73/295 |
| 7,392,691 | B1 | * | 7/2008 | Yeckley ...................... 73/64.55 |
| 2008/0041152 | A1 | | 2/2008 | Schoenberg |
| 2011/0138906 | A1 | * | 6/2011 | Schastok et al. ............ 73/304 R |

FOREIGN PATENT DOCUMENTS

JP CN 101644654 * 1/2013

OTHER PUBLICATIONS

"Using the PIC MCU CTMU for Temperature Management," Microchip Technology Inc., http://ww1.microchip.com/downloads/en/appnotes/93016a.pdf, 2009, six pages.

* cited by examiner

*Primary Examiner* — John Fitzgerald
*Assistant Examiner* — Truong Phan
(74) *Attorney, Agent, or Firm* — Lewis Rice LLC

(57) ABSTRACT

An electronic fuel sensor which utilizes the characteristics of fluid (such as gasoline) to dissipate heat more readily than a gas. Specifically the fuel sensor utilizes a linear array of sensors comprising a couple heat detector and heat source which can determine which of the sensors are in fluid and which are in air.

15 Claims, 11 Drawing Sheets

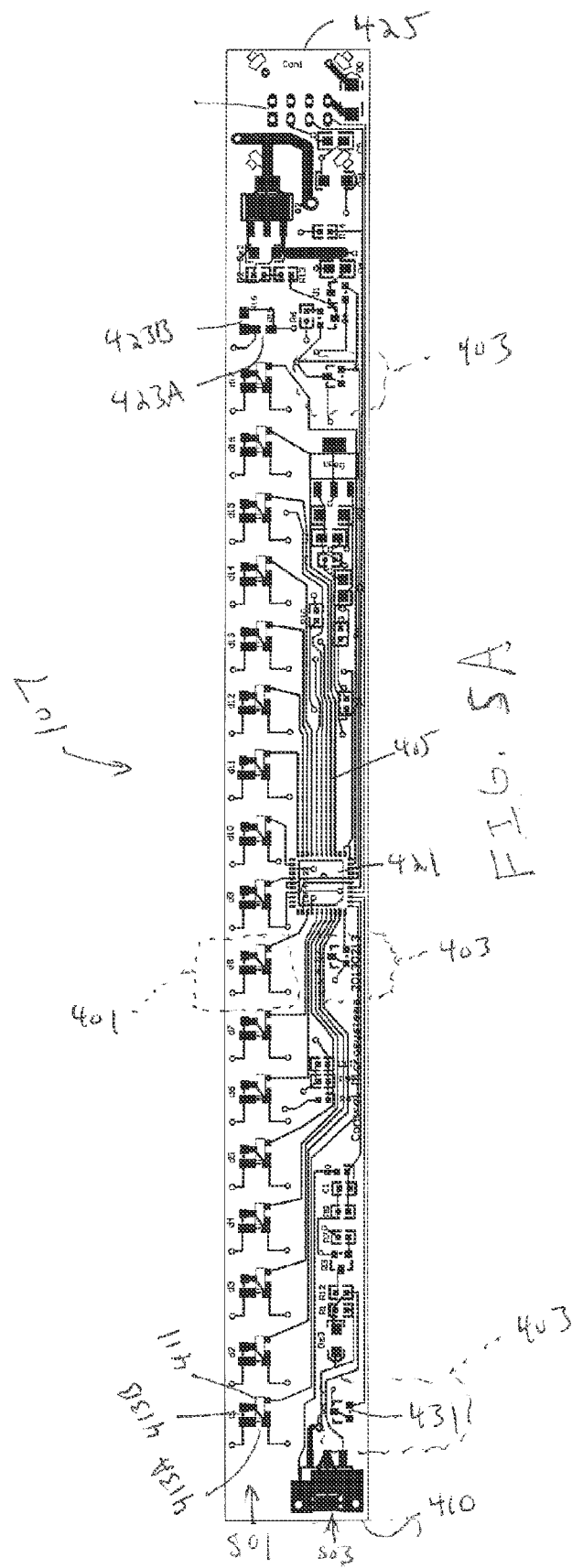

FUEL LEVEL SENSOR

BACKGROUND

1. Field of the Invention

The invention generally relates to fluid level sensors; in particular, to a solid state fuel level sensor for automobiles.

2. Description of Related Art

When driving an automobile, it is important that the driver know how much fuel remains within the gas tank so that he or she can refuel the vehicle before it runs out of fuel. While automobiles have become increasingly sophisticated over the years, vehicle fuel sensors have mostly stayed the same. Traditional sensors utilize a mechanical action associated with a float valve or level disposed within the fuel tank. The float valve or level will generally alter the resistance of a variable resistor based on the height of the fuel in the tank as the float valve floats on the fuel's surface. This resistance can then be communicated via standard onboard electronics to an automobile's onboard processor which can provide an indication of the fuel level to the driver. The value can be provided with a traditional fuel gauge, or can be provided in more modern forms such as a "miles to empty" display. These types of mechanical sensors suffer from a variety of inadequacies, including sensitivity to fuel types, fuel sloshing and mechanical breakdowns.

Fuel sloshing is a particular problem in determining the amount of fuel in a fuel tank. While the level will generally be fairly static when the vehicle is idling at rest, vibration of the automobile combined with its movement, change in the elevation of terrain being traversed, and other factors can all serve to make the measurement of the amount of fuel in the fuel tank more difficult than expected. As the vehicle shifts, the fuel in the tank will also shift. As a fuel sensor generally has to measure the amount of fuel at a particular point, if that point is subject to movement due to actions of the automobile, the fuel level can be seen to fluctuate. To deal with this problem, many mechanical systems are designed to be purposefully slow to react such as by having delay built in. In this way, small changes are simply not detected (and therefore not provided to the driver) and the decrease in fuel level appears more smooth.

Further, mechanical fuel sensors can have problems with the variety of fuel types on the market today. The introduction of ethanol and other fuel additives to gasoline, which are often added in not insubstantial percentages, can cause mechanical fuel gauges to read consistently wrong. Since a mechanical fuel gauge generally floats on the surface of the fuel, substantial changes in fuel density and other properties can result in a fixed level of error being introduced to the sensor. Foaming or other state changes to the fuel can also provide for inadequate readings as the float valve gets mired in foam. Further, ethanol, and a number of other fuel additives, are highly corrosive and can cause damage to the mechanical or electrical components of the fuel sensor.

In sum, many automobile companies are forced to design specific fuel sensors for specific vehicles and specific fuel types in order to compensate for the inadequacies of the mechanical fuel gauge. This requires stocking an increased number of parts and presents the potential problem that a vehicle is assembled with an inaccurate fuel sensor and will always read inaccurately or with a fuel sensor that is simply inadequate for the vehicle. This can result in an unexpected breakdown for the owner when they unexpectedly run out of fuel and can also result in difficulty when repairs are required.

SUMMARY

Because of these and other problems in the art, described herein is an electronic fuel sensor which utilizes the characteristics of fluid (such as gasoline) to dissipate heat more readily than a gas. Specifically the fuel sensor utilizes a linear array of sensors comprising a coupled heat detector and heat source which can determine which of the sensors are in fluid and which are in air.

There is described herein, among other things, a fuel level sensor comprising: a plurality of measurement sensors arranged in a vertical array, each of the measurement sensors including: a thermal diode; and a resistor; a plurality of calibration sensors arranged in a vertical array, each of the calibration sensors including a thermal diode; and a microprocessor; wherein each one of the calibration sensors in the plurality is arranged at a vertical position in the vertical array corresponding to a vertical position of one of the measurement sensors; wherein each of the calibration sensor and the measurement sensor having the same vertical position comprises a sensor pair; wherein the microprocessor causes at least some of the resistors to generate heat and to cool; wherein the microprocessor records the change in temperature of all the thermal diodes in the measurement sensors with heat generating resistors; and wherein the microprocessor using the changes in temperature to calculate a level of fluid into which the fluid level sensor is at least partially immersed.

In an embodiment of the fuel level sensor, the plurality of measurement sensors includes at least 10 measurement sensors.

In an embodiment of the fuel level sensor, the plurality of measurement sensors includes at least 15 measurement sensors.

In an embodiment of the fuel level sensor, the plurality of measurement sensors includes 17 measurement sensors.

In an embodiment of the fuel level sensor, the plurality of calibration sensors includes at least 3 calibration sensors.

In an embodiment of the fuel level sensor, the plurality of measurement sensors includes more measurement sensors than the plurality of calibration sensors includes calibration sensors. It may include 17 measurement sensors and 3 calibration sensors.

In an embodiment of the fuel level sensor, each of the measurement sensors in the plurality further comprises an additional resistor.

In an embodiment of the fuel level sensor, the resistor is arranged beside the thermal diode and the additional resistor is arranged below the thermal diode.

In an embodiment, the fuel level sensor further comprises a resistor arranged above the vertical array formed from the plurality of the measurement sensors.

In an embodiment of the fuel level sensor, the microprocessor outputs the fuel level in the form of a pulse width modulated wave.

In an embodiment of the fuel level sensor, the pulse width modulated wave goes into a circuit which generates a signal mimicking a variable resistor.

There is also described herein a fuel level sensor comprising: a housing including: an elongated tube having proximal and distal ends, a cap at the distal end, a base at the proximal end, and a hollow interior volume; a hole arranged in the base; and a hole arranged toward the distal end; a sensor board in the hollow interior volume, the sensor board including: a plurality of measurement sensors arranged in a vertical array, each of the measurement sensors including: a thermal diode; and a resistor; and a plurality of calibration sensors arranged in a vertical array, each of the calibration sensors including a thermal diode; and a microprocessor; wherein each one of the calibration sensors in the plurality is arranged at a vertical position in the vertical array corresponding to a vertical position of one of the measurement sensors.

In an embodiment of the fuel level sensor, the plurality of measurement sensors includes more measurement sensors than the plurality of calibration sensors includes calibration sensors.

In an embodiment of the fuel level sensor, the sensor board is coated with a polymer.

In an embodiment of the fuel level sensor, the polymer is poly(p-xylylene) polymer.

In an embodiment, the fuel level sensor further comprises a connector for attaching the housing to a fuel tank mounting.

In an embodiment, the fuel level sensor further comprises an 8-pin connector for connecting the sensor board to an automobile's onboard electronics.

In an embodiment of the fuel level sensor, the housing further comprises a plurality of feet separating the base from a bottom of an automobile fuel tank.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

FIG. 2A shows a front view of the housing FIG. 2B shows a left side view of the housing. FIG. 2C shows a sectional view, along line A-A in FIG. 2A, of the housing.

FIG. 3A is a rear perspective view. FIG. 3B is a front perspective view.

FIG. 4A shows the sensor circuit FIG. 4B shows the microprocessor FIG. 4C shows the power supply circuit FIG. 4D shows the output signal circuit.

FIGS. 5A-5B show an embodiment of a circuit board of an embodiment of a fuel level circuit. FIG. 5A shows the top of the circuit board and FIG. 5B shows the bottom.

DESCRIPTION OF THE PREFERRED EMBODIMENTS

Figure 1:
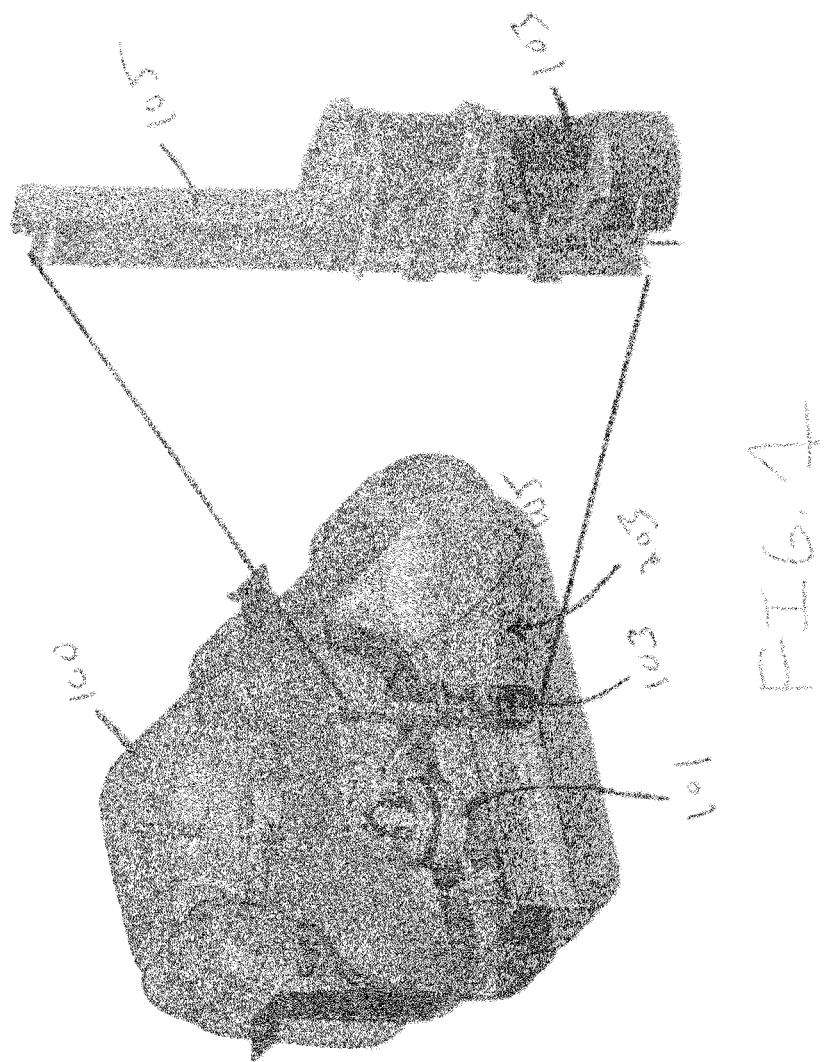
FIG. 1 shows an embodiment of a housing for a fuel level sensor as it could be positioned in a fuel tank.
Figure 2:
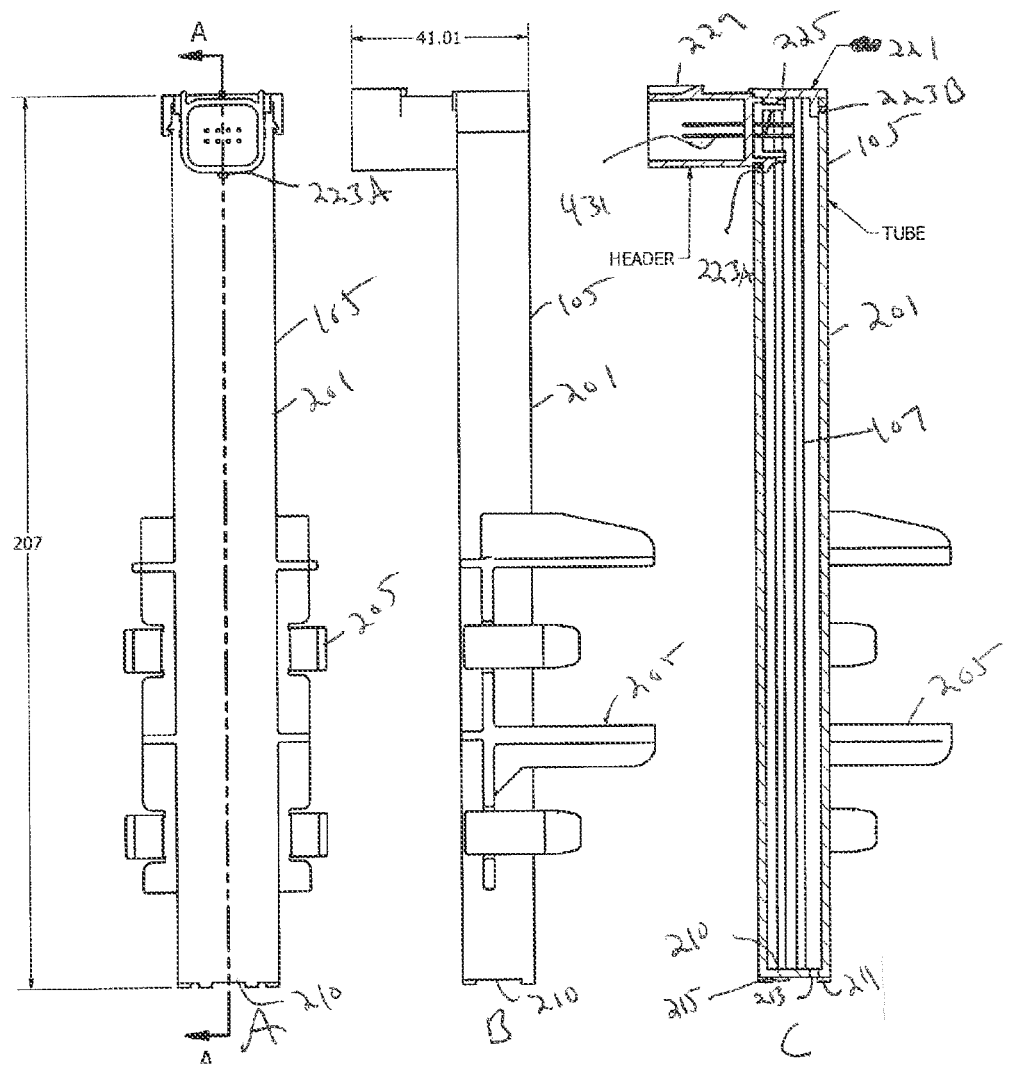
FIGS. 2A-2C show various views of an embodiment of an assembly housing.
Figure 3A:
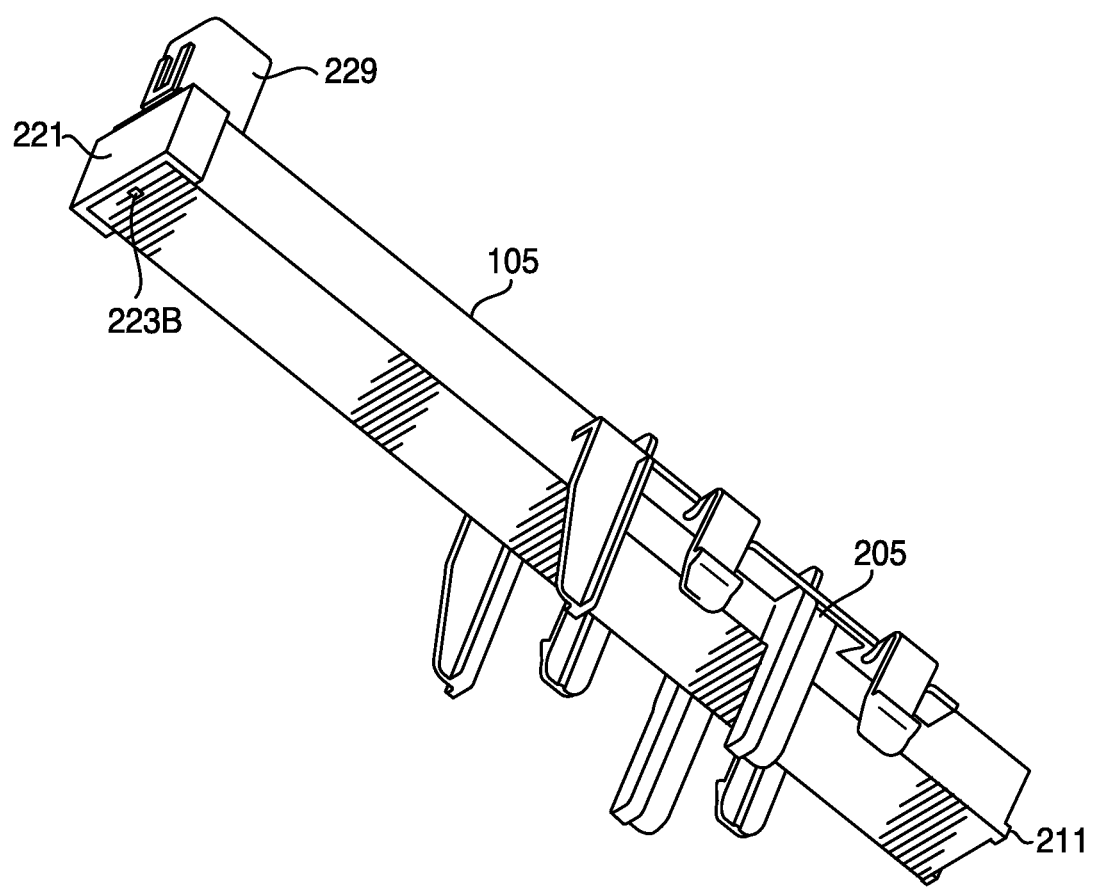
FIGS. 3A and 3B show perspective views of the assembly housing of FIGS. 2A-2C.
Figure 3B:
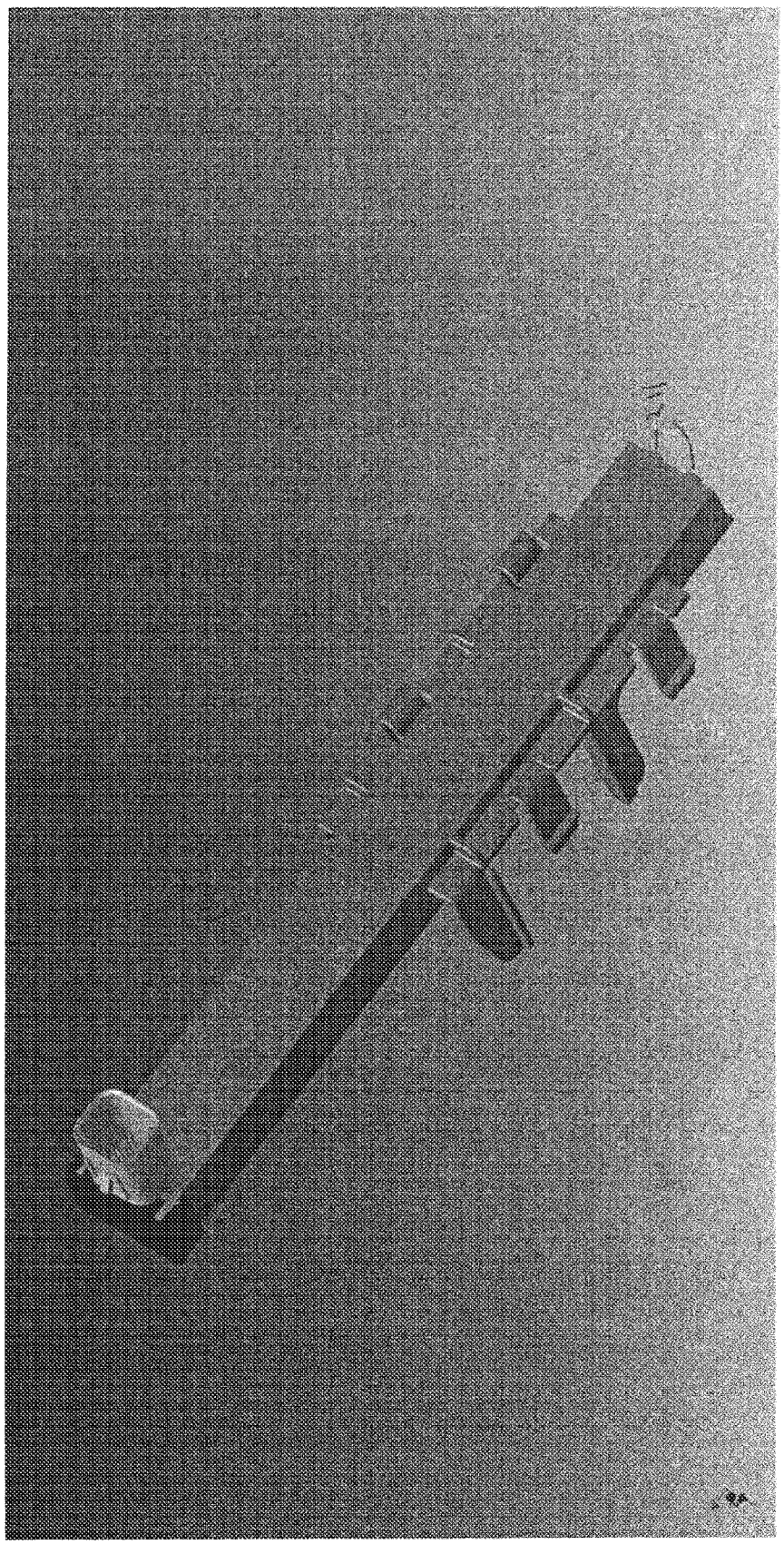

FIG. 1 provides for a cutaway view of a typical fuel tank (100) of an automobile. All fuel tanks in modern automobiles are of unique shape as they are generally fit into the vehicle after all the other components are placed and are simply allowed to fill available space. Thus, as can be seen in FIG. 1, the tank (100) often has a very convoluted shape which is not regular. Generally toward the fluid center of the tank is a FDM (101) which serves to feed fuel from the tank (100) to the engine. The fuel delivery module (FDM) (101) is generally situated in a location so that it is somewhat insulated from fuel sloshing or flowing around in the tank (100) to insure that the flow of fuel to the engine is constant.

There is also attached in the tank a fuel level sensor. The sensor is in a housing (105). The housing (105) is attached to a connector (103) for the purposes of mounting it in the tank (100). The housing (105) will generally be positioned towards the fluid center of the fuel tank (100) as this usually provides for the best reading with the fuel level being less effected by the angle of elevation of any portion of the tank when it is measured at the center. The housing (105) is, in many cases, mounted to the FDM (101), even though that is not shown in FIG. 1, so that a reading as to the amount of fuel at the FDM (101) is taken. In order to obtain an accurate reading, it is desirable to have the housing (105), and thus the sensor board (107) internal thereto, be mounted at a fixed distance from the bottom of the tank (100). Fuel tanks (100) are designed to flex and regularly deform based on the mass of fuel in them. Thus, as can be seen in FIG. 1, the housing (105) is attached in proximity to the base of the fuel tank by the mount (103). Specifically, the housing (105) is bottom referenced.

FIGS. 2A-2C and 3A-3B provide for various views of the fuel sensor and specifically the housing (105) separated from the mount (103) and the tank (100). The housing (105) generally comprises a hollow elongated tube (201) which comprises the majority of its structure. The tube (201) houses the sensor board (107), which is in the form of a circuit board, in its internal volume (203). The sensor board (107) may be attached to the housing (105) but is generally press fit to allow for the sensor board (107) to be easily removed from the tube (201) to allow for replacement. The tube (201) in FIGS. 2A-2C and 3A-3B is shown as a generally regular elongated parallelepiped, but this is by no means required and in alternative embodiments, the tube (201) can be cylindrical, a triangular parallelepiped, or any other elongated hollow volume.

On the outside of the tube (201) are connectors (205). The type, shape, and size of connectors (205) is generally dictated by the brand of automobile the sensor board (107) is to be used in as most automobile manufacturers have specific designs they use. For that reason, while it is contemplated herein that connectors (205) be present, their exact design is not discussed at length as it will be determined by the automobile the sensor board (107) is to be placed in.

At a proximal end (210) of the elongated tube (201), the tube (201) has on its base (215) a plurality of small feet (211). In the depicted embodiment, there are four feet (211). As the proximal end (210) will generally be arranged downward (in proximity to the bottom of the tank (100)), it will be the lowest point of the housing (105) when the housing (105) is positioned in the fuel tank (100). These feet (211) serve to space the bottom (215) of the tube (201) from the surface of the bottom of the tank (100). This allows fuel in the tank (100) to flow under the tube (201).

The bottom (215) of the tube also includes a hole (213). The hole (213) is generally very small, often on the order of 1-2 millimeters (mm) in diameter. The hole (213) allows for fuel in the tank (100) to flow from the tank (100), through the hole (213) and into the hollow interior volume of the tube (201). As would be apparent to one of ordinary skill in the art, for a fixed fuel level in the tank (100), the level in the tube (201) along the elongated length will generally match. The fuel will thus fill the volume of the tube (201) until it is at equal height to the fuel in the tank (100). Thus, the volume inside the tube (201) serves as an antechamber to the tank (100). In an alternative embodiment, the hole could be on the side of the tube (201) simply arranged toward the proximal end (210). This would be preferred if the base (215) would be at or below the bottom of the fuel tank (100).

While the height of fuel in the tube (201) will generally be similar to the height of fuel in the tank (100), and thus can be used to directly determine the amount of fuel in the tank (100), the use of the tube (201) is desirable to insulate the sensor board (107) from much of the sloshing of fuel in the tank (100) as the housing (105) provides hydraulic damping. As the tube (201) is much longer than it is in width or depth, fuel in the tube (201), even when the tube (201) is violently lurched, will often not create significant waves or sloshing and will clearly not do so as much as the fuel in the tank (100) will under similar circumstances. Further, even if violent sloshing with a relatively empty tank was to occur so that fuel was temporarily removed from the location under the bottom (215) of the tube (201), the hole (213) being small will generally inhibit significant amounts of fuel from flowing from the tube (201) in the short time it could drain. Thus, the tube (201) provides for a partially isolated sample antechamber that is less prone to variations in the tank (100).

As the sensor board (107) in the tube (201) will thus be at least partially immersed in the fuel in the tank (100) (if it is not, the tank is virtually empty and the fuel sensor will simply return an empty indication), the circuit and the components on the sensor board (107) will generally need to be protected from the potentially hostile and corrosive nature of the fuel. In an embodiment, this is accomplished by coating the sensor board (107) with a protective coating designed to resist the effects of gasoline, diesel, ethanol, or other common fuel components. In an embodiment, this coating comprises poly (p-xylylene) polymer which is commercially available as Parylene™.

At the distal end (225) of the tube there is a cap (221), which is removable to allow the sensor board (107) to be removed for repair or replacement. As should be apparent, the sensor board (107) comprises an elongated printed circuit board with attached components which is suspended within the tube (201). The sensor board (107) layout is discussed in greater detail in conjunction with FIGS. 5A and 5B. There are also included two holes (223A) and (223B), although that number is by no means required. These holes (223A) and (223B) are provided to allow air to escape from the interior volume of the tube (201) so that fuel can move into the tube (201) from the hole (213) at the bottom (210). The distal end (225) of the tube (201) also includes a header (229). The header (229) mounts an 8-pin connector (461) from the sensor board (107) in a manner so that it can be press fit connected to a pin jack (not shown) from the automobile's electrical system, thus, connecting the sensor board (107) to the onboard electronics of the automobile.

While connection to the vehicle is the primary purpose of the header (229) and connector (461), it is not the only purpose. As is discussed below, the output to the onboard electronics of the sensor board (107) is generally a single signal in the form of a resistance. An 8-pin connector (461) is not required to send such a signal. However, as can be seen in FIG. 4C, the remaining pins can be used to provide for diagnostic information such as the output of specific sensors (401) from the sensor board and can also be used to reprogram ("reflash") the microprocessor (421) without having to remove the sensor board (107) from the housing (105).

Figure 4A:
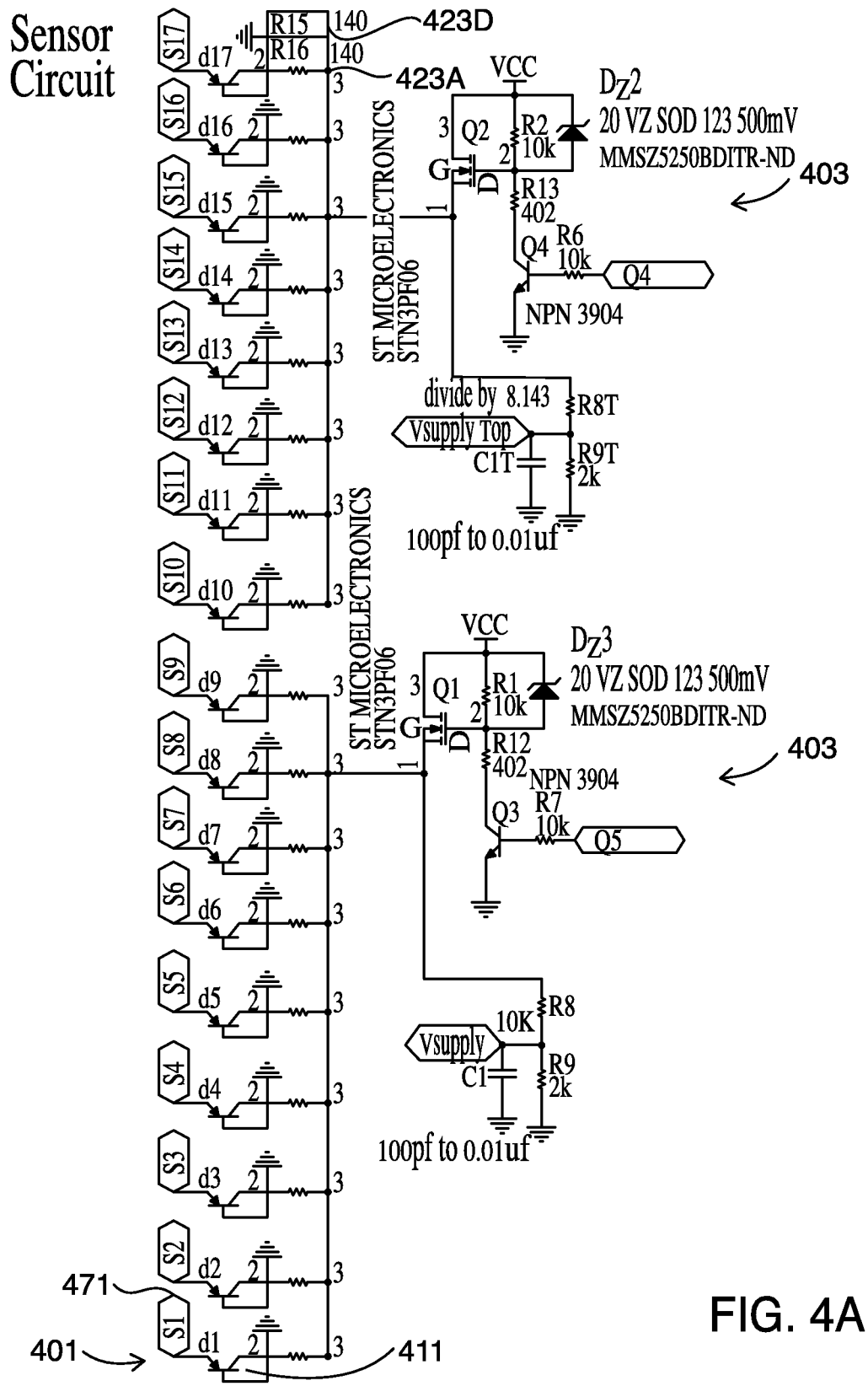
FIGS. 4A-4D show an embodiment of a circuit diagram of an embodiment of a fuel level sensor circuit.
Figure 4B:
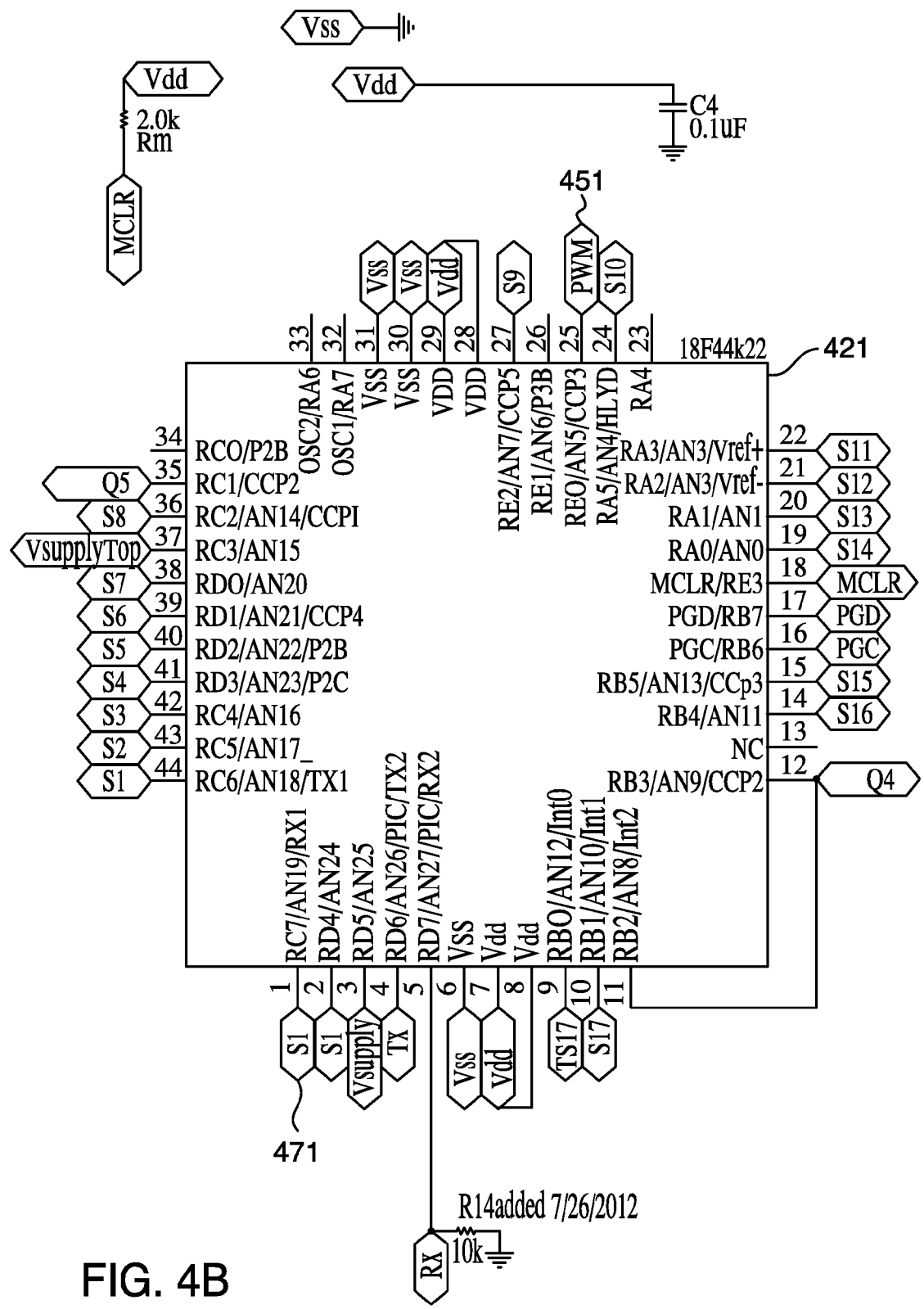
Figure 4C:
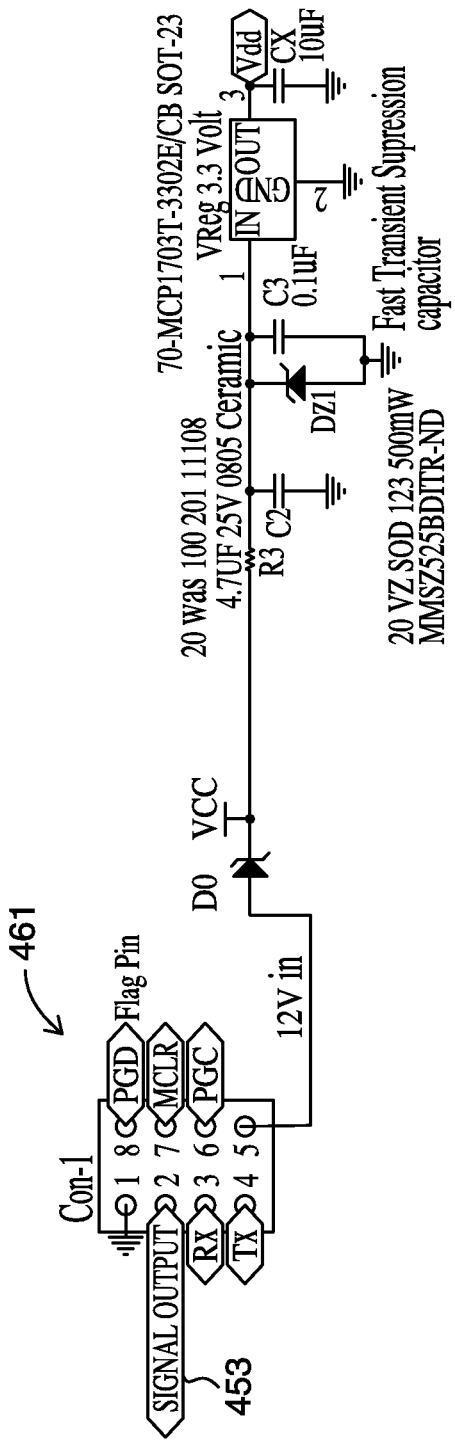
Figure 4D:
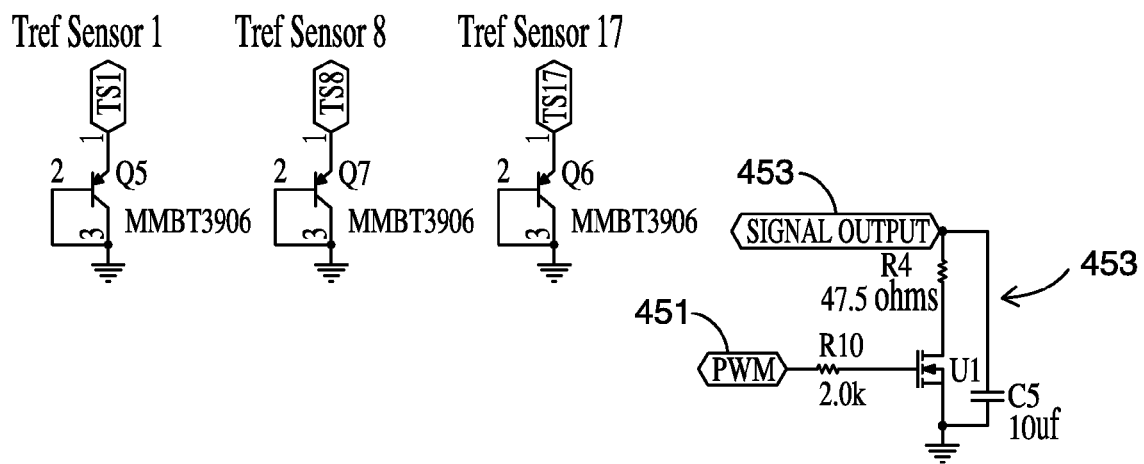
Figure 5B:
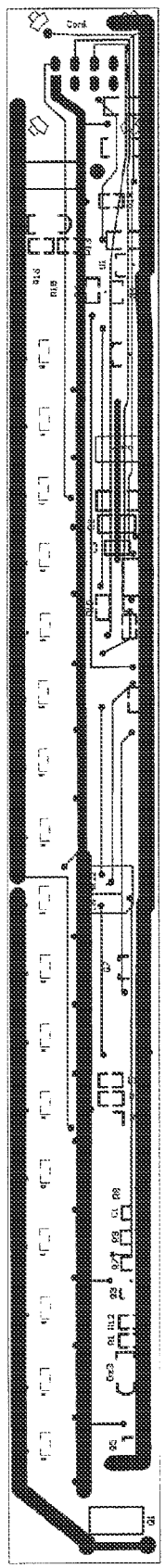

FIGS. 4A-4D provide for circuit diagrams of certain components of the sensor board (107). Specifically, FIG. 4A provides the circuit for the sensor array, FIG. 4B provides for the microprocessor, FIG. 4C provides for the power supply and 8 pin connector (461) arrangement, and FIG. 4D provides for the output signal circuit which can mimic a variable resistor. FIGS. 5A and 5B provide for an exemplary circuit layout of a sensor board (107). As the physical location of the sensor board (107) components is relevant to their function, these figures are all discussed together.

The sensor board (107) has a specific proximal (410) and distal (425) end. When the sensor board (107) is placed in the housing (105), the proximal end (410) of the sensor board (107) is arranged toward the proximal end (210) of the tube (201) with the distal end (425) of the sensor board (107) arranged toward the distal end (410) of the tube (201). Thus the distal end (425) of the sensor board (107) is generally the "top" and the proximal end (425) is the "bottom".

In the sensor circuit of FIG. 4A, a plurality of discrete measurement sensors (401) are mounted and spaced apart along the sensor board (107) in a generally linear and regular fashion. These measurement sensors (401) form a linear measurement sensor array (501) as can be seen in FIG. 5A. In the embodiment of FIGS. 4A and 5A the array (501) can comprises a number of sub arrays, in this case two but that number is not required, which can be controlled independently to provide for power savings. The sensors (401) each comprise at least one heating element and a heat sensor. In the depicted embodiment, the heat sensor comprises a thermal diode (411) operatively connected to, and in close proximity to, a pair of resistors (413A) and (413B) as shown in FIG. 5A which form the heating element. The resistors (413) are driven by a known voltage to produce a particular amount of heat. Since electrically the pair of resistors (413A) and (413B) (in series) are essentially one element, they are shown singly as resistor (413) in FIG. 4A. Each of the sensors is operatively connected to a microprocessor (421) or other suitable logic circuit as indicated by the sensor connections (indicated by example (471)) in FIGS. 4A and 4B.

As can be seen in FIG. 5A it is preferable that each thermal diode (411) be provided with two resistors (413A) and (413B) comprising a functional resistance (413). The resistors (413A) and (413B) are arranged in a generally "L" shape with one resistor (413A) directly below the thermal diode (411) and one resistor (413B) to the side of the thermal diode (411). The resistor (413B) to the side is preferably on the side opposed to the other electronics and the location of any paired calibration sensor (403), thus, placing the thermal diode (411) between the resistor (413B) and the thermal diode (431).

In this arrangement, since heat generated by the resistors (413A) and (413B) generally radiates spherically from each resistor (413A) and (413B), a large percentage of heat from each resistor (413A) and (413B) is directed into the thermal diode (411) immediately after it exits the resistor (413A) or (413B). This creates a greater possible temperature differential at the thermal diode (411), and thus more sensitivity. Further, the positioning of the resistors (413A) and (413B) minimizes the heat that the calibration sensors (403) can detect from the resistors (413A) and (413B) by increasing the distance. While it can be beneficial for these reasons, the "L" arrangement is not required and in alternative embodiments only a single resistor, or more than two resistors can be used in each measurement sensor (401).

As is also shown in FIG. 5, etching (405) for the circuit, and the microprocessor (421), are also preferably placed at as great a distance as possible from the measurement sensors (401). Thus, any heat generated by the remainder of the circuit generally will have less effect on the measurement sensor (401) as it will be more readily dissipated before reaching the diode (411).

As should be apparent in FIGS. 4A and 5A, each measurement sensor (401) comprises the resistors (413A) and (413B) along with the thermal diode (411) and a plurality of measurement sensors (401) are arranged vertically along the sensor board (107) to form an array. In the embodiments of FIGS. 4A and 5A, there are 17 measurement sensors provided in the array, each with the same construction. As it has been determined that each sensor (401) in the array also detects a small amount of heat from the resistor located above it (e.g., for sensors 1 to n, the n−x diode detects some heat from the n−x+1 resistor), the sensor board (107), as can be best seen in FIGS. 4A and 5A, includes additional resistors (423A) and (423B) at the distal end (425) of the sensor board (107) with no associated diode. This helps to maintain similarity in available heat between the top (nth) sensor and each lower sensors (1 through n−1).

The array (501) of measurement sensors (401) does not comprise all the sensors on the sensor board (107). There is also included on the board a second array (503) of sensors. These are called calibration sensors (403). The calibration sensors (403) also comprise a thermal diode (431) but do not have an associated heating element. While two calibration sensors (403) are shown in FIG. 4A, FIG. 5A shows three calibration sensors (403). Neither number is required. However it is generally preferable to have at least two calibration sensors (403) and no more calibration sensors (403) than there are measurement sensors (401).

Each of the calibration sensors (403), as can be best seen in FIG. 5A, is generally arranged at or near the same linear position as one of the measurement sensors (401). Specifically, in FIG. 5A one calibration sensor is arranged at or near the same height as the sensor (401) at the first (lowest) position, another at the same height as the sensor (401) at the eighth position, and the third at the same height as the sensor (401) at the seventeenth (highest) position in the array (501) of seventeen sensors. These measurement sensors (401) happen to be the lowest, the highest, and one of the central positions, but that is by no means required.

In operation, the microprocessor (421) cycles the resistors (413) over a predetermined period of time, first heating them and then allowing them to cool. The thermal diodes (411) of each discrete sensor (401) pick up the heating and dissipation based on their proximity to the resistors (413). The output signal from each thermal diode (411) is in the form of a measured voltage level that is sampled while the microprocessor (421) is outputting a small current into the anode side of the thermal diode (411) over a period of time during the heating and/or cooling phase of the cycle and can identify the change in temperature of the thermal diode (411) over time. This change in temperature is in response to the application or extraction of heat over the given period of time. Measurement sensors (401) which are immersed within the fuel stored in the fuel tank (100) will respond differently to the heating and cooling cycle as compared with those which are in air. However, measurement sensors (401) in air will behave similar to each other and measurement sensors (401) in fluid will behave similarly to each other. Thus, measurement sensor (401) data should have two clearly visible clusters. Nevertheless, the closer that a measurement sensor (401) is to being in contact with the fuel when it isn't in it, the faster the heat will dissipate from the sensor due to the proximity of the fluid level. This can be used to fine tune, via interpolation or similar mathematic methods, the determination of fuel level as the measurement sensor (401) immediately above the fuel level, will be transitioning from the lower (in fuel) cluster to the higher (in air) cluster.

Figure 6:
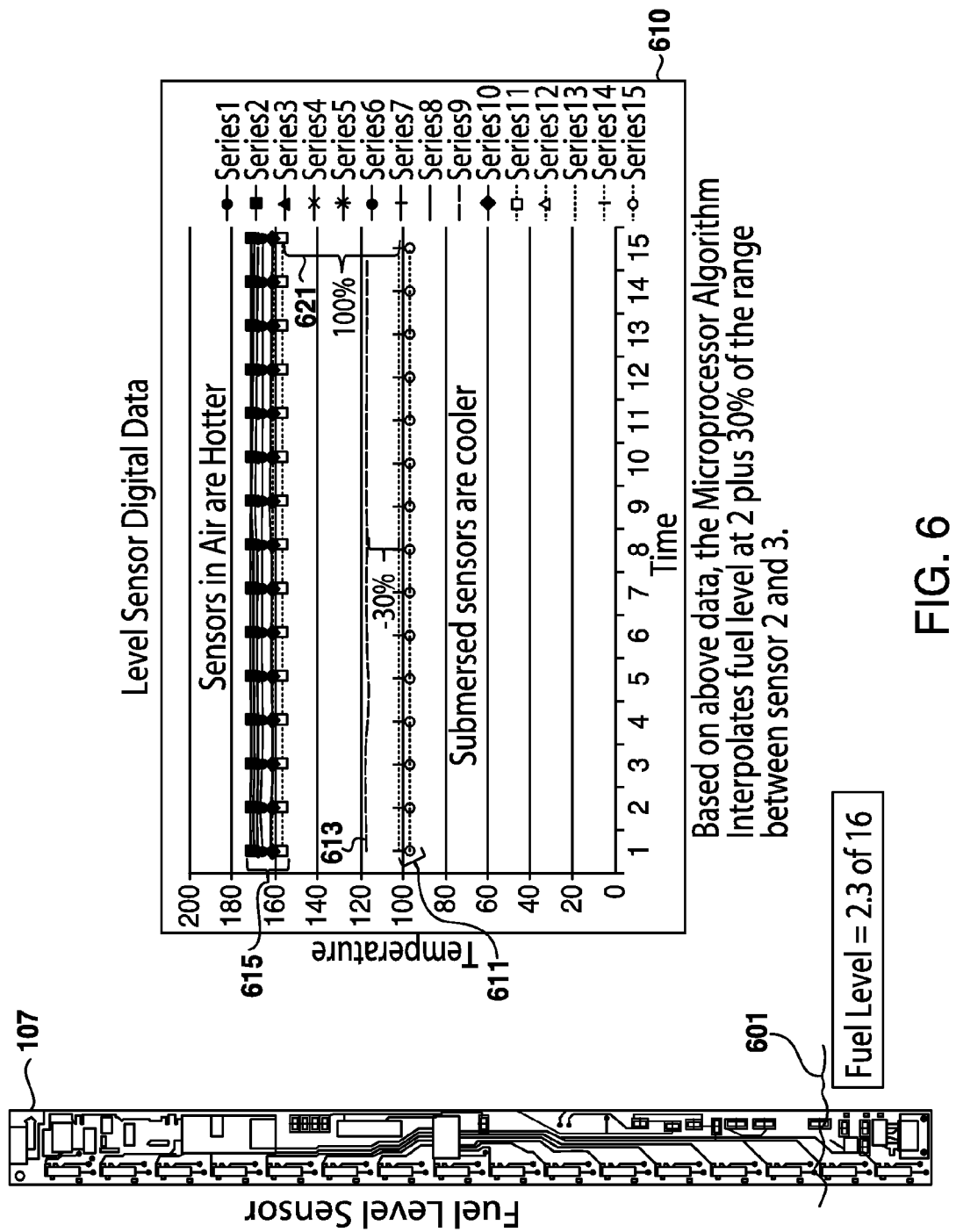
FIG. 6 shows level sensor data indicating how to determine the fuel level that is between measurement sensors.

How to calculate the fuel level utilizing this transition is graphically shown in FIG. 6. In FIG. 6, a sample fuel level sensor board (107) is provided which has sixteen measurement sensors (401). The sensor board (107) is placed into fuel (601) at a level which is smooth at 2.3 sensors deep. To put this another way, the lowest two sensors on the sensor board (107) are submerged and the fuel level is 30% of the way between the second and the third lowest sensors on the board (107) as illustrated. The right hand side of FIG. 6 provides the graphical return (610) of the 16 sensors. The vertical axis is provided as a raw temperature, but this is done simply to be indicative of different temperature differentials and the labels do not comport to any particular temperature but simply provide a fixed coordinate system so the relative positioning is easy to see. This is why the lower cluster (611) is positioned at a round number (specifically one-hundred).

As can be seen, the lines for the two submerged sensors are closely clustered (611) and "cooler" (faster heat dissipation) due to heat being more readily dissipated by the fuel (601). Similarly, the highest thirteen sensors are also closely clustered (615) and significantly "hotter" (slower heat dissipation). The third sensor up from the bottom is at a position (613) between the cluster (611) and (615) indicating that the fuel level is between the second and third lowest sensors (which indeed it is) as the second sensor is in the fuel and the third sensor is transitioning from being in fuel to being in air.

In order to more precisely locate the fuel level, an arbitrary scale of 0-100 is chosen as the (effectively percentage) distance of the fuel from the highest sensor in the fuel, to the second lowest sensor cleanly in the air (in FIG. 6 this is between the second sensor and the fourth sensor from the bottom). This is shown as scale (621). The difference in signal from the immediately submerged sensor (the second in FIG. 6), to the second highest sensor (the fourth in FIG. 6) is then subdivided by the distance between the immediately submerged sensor ((the second sensor from the bottom of FIG. 6) and the transition sensor (the third sensor from the bottom of FIG. 6). The reading (613) for the transition sensor is 30% of the scale (621). Thus, this implies that the fuel level is 30% of the way up from the second sensor to the third sensor from the bottom. Thus, the fuel is at 2.3 sensors of height (which indeed it is).

It should be recognized that this interpolation is most accurate toward the space at the center of the two sensors as surface effects of the fuel not being a completely level surface will have more of an effect the closer the fuel level is to one of the sensors. For example, a very small ripple can move a sensor (401) into or out of fluid if the fuel level is very close but not quite touching the sensor (401) or, using the parlance of FIG. 6, the percentage reading is more accurate between 20% and 80%, still more accurate between 30% and 70%, still more accurate between 40% and 60%, and most accurate around 50% of the distance between the sensors. However, as the exact value of the amount of fuel is rarely returned by a fuel gauge and as the sensors (401) may be arranged at a close distance (often being spaced apart by a distance about equal to their own length), slight variation is acceptable as the fuel reading is already very accurate.

To further enhance the accuracy of the fuel sensor, the fuel sensor is provided with calibration sensors (403) as discussed above. Without being tied to any particularly theory of operation, the following is useful to understand how the calibration sensors (403) work. Sensors in air will have less dissipation from the neighboring heating elements than those that are in fuel. However, due to local currents in the air and fuel, the dissipation will never be entirely the same for any two sensors. Similarly, as heat from one heating element can also affect another sensor due to dissipated heat from one element being dissipated to a different sensor, there will always be a slight spread in both the submerged sensors and the in-air sensors. Further, even among sensors that are fully submerged or fully in air, there is generally a noticeable fixed difference in that lower sensors are slightly cooler than higher sensors simply because atmospheric heat is not evenly distributed.

As will be seen in FIG. 6, there is a slight spread within the values for sensors in air (615) and within the values of sensors in fluid (611). This slight variation is believed to be caused by local variations right around the specific sensors. For example, as heat rises, it is expected that higher sensors will always be hotter than lower sensors. Further, local eddy currents in the air or water which may be caused by vehicle movement could result in slightly different dissipations.

Because of these concerns, the sensor board (117), as shown in FIGS. 4A and 5A, includes an array (503) of calibration sensors (403). These calibration sensors (403) are arranged at identical height to at least some of the measurement sensors (401) and include generally identical diodes (431). However, they do not include any resistors (413). Thus, these diodes (431) monitor passive heat at the particular height where they are positioned. In the depicted embodiment of FIG. 4A, the system includes two calibration sensors (403), one at the middle (across from the middle sensor, ninth from the bottom) and one at the top (the position seventeenth from the bottom).

In the embodiment of FIG. 5A, there are three calibration sensors (403), one at the top (seventeenth position), one near the middle (eighth position), and one at the bottom (first position). It does not matter which sensor position includes calibration sensors (403), and in an embodiment every measurement sensor (401) could include a calibration sensor (403); however, that can result in too much board space being occupied than is practical so fewer are often used.

It will be understood that it does not matter if the calibration sensors (403) are submerged or in air. What matters is that they are at a very similar height—each is at the same relative distance from both the proximal (410) and distal (425) ends of the sensor board (107)—as an associated measurement sensor (401). This is so that the specific measurement sensor (401) and the associated calibration sensor (403) pair are in the same fluid condition, whatever that condition might be. As the calibration sensors (403) are not exposed to active heating, they will detect temperature changes effecting both sensors (401) and (403) with minimal effect from the active heating elements. In this way, they can serve to calibrate their associated measurement sensor (401) based on expected changes. Further, as there are preferably multiple calibration sensors (403) on the sensor board (107), differences between the calibration sensors (403) within the array (503) can be extrapolated as also representing differences between measurement sensors (401) in the array (501).

An example of how the calibration can work is as follows. Let us take a calibration sensor (403) and measurement sensor (401) pair at position n and a second calibration sensor (403) and measurement sensor (401) pair at position n+5. Let us assume that both are in fuel with the measurement sensor of the lower pair being 10 and the higher pair being 12. Further, the calibration sensor of the lower pair is 1 and the higher pair is 1.2. Based on this, one could presume that 20% of the reading of the higher pair is due to local effect (as each pair is off by 20%) and the microprocessor (421) could treat the higher pair's measurement sensor as actually reading 10. This would tighten the cluster of sensors (611). Further, the sensor in positions n+1 through n+4 could also have their measurement sensor values reduced by 20% which should further tighten or normalize the cluster (611) if the effect is correctly recognized.

While the above example presumes a percentage difference, it should be apparent that a literal difference (e.g., 0.2) could be used in an alternative embodiment. Still further, a percentage and literal difference could be used interchangeably on the same sensor board (107) as the microprocessor interpolates the changes relative to all the available measurement sensor (401) and calibration sensor (403) pairs.

While the measurement sensors (401) are described above as a thermal diode (411) combined with two resistors (413A) and (413B), and the calibration sensors (403) are described as a thermal diode (431) which is essentially the same type of diode as thermal diode (411), without a paired resistor, it would be understood by one of ordinary skill in the art that this arrangement is exemplary and the sensors (401) or (403) may comprises any combination of relevant heat sensing elements and/or and a heating elements. For example, the resistors (413A) and (413B) may be omitted in an embodiment and merely a thermal diode (411) may be used as the heating element and heat sensing element by utilizing the internal resistance of the thermal diode for heat generation. Alternatively, the thermal diode may comprise a NPN or PNP transistor wherein the base and collector are connected or simply by using a standard PN junction-type diode. Similarly, a single resistor, or three or more resistors could be used for heat generation.

Once a fuel level has been determined by the microprocessor (e.g., as 2.3 sensors in FIG. 6), the microprocessor (421) will return a value indicating the amount of fuel in the tank. FIGS. 4B-4D provide circuit diagrams for how such a value may be provided. A couple of notable items should be called out. Because of the presence of the 8-pin connector (461) and the ability to obtain diagnostic output and provide input, it is possible to remotely "reflash" the microprocessor (421). This allows its calibration settings, or other settings, to be modified without having to remove the sensor board (107) from the tank (100). This can be highly desirable if the sensor board (107) is discovered to have a systematic error. FIG. 4C provides a power circuit showing the connection of the pins and one of ordinary skill in the art would understand how this may be accomplished.

FIG. 4D provides for an output circuit for the signal. In order to allow for the sensor board (107) to interface with traditional automobile onboard electronic systems which are expecting the fuel level to be provided as a variable resistance (as that is what is traditionally provided by a mechanical sensor), the circuit of FIG. 4D is designed to use a Pulse Width Modulated (PWM) wave signal (451) which is generated based on the number (or percent) of sensors (401) submerged. The circuit (453) then uses this signal (451) to simulate a variable resistance with a high degree of accuracy. Thus, the microprocessor (421) will generally output the sensor result as a PWM signal (451) which adjusts the appearance of a variable resistance in the output signal (453) and mimics the form of expected output to the automobile's electronics. The onboard electronics of the automobile will then utilize this signal to present a fuel value to the user in a manner understood by one of ordinary skill in the art.

In an embodiment, while the above has focused on utilizing the sensor board (107) to monitor the level of fuel in a fuel tank (100) it should be recognized that the sensor board (107) can be used to sense the level of other fluid on-board a vehicle. In particular, the sensor board (107) can be used to measure the level of urea tanks used for the scrubbing of diesel exhaust. This is often called Diesel Exhaust Fluid "DEF" or AdBlue™. Because the DEF can freeze at a relatively high temperature, it often requires an onboard heater in order to insure it remains liquid. As the sensor board (107) generates heat as part of its action in measuring fluid level, it can be particularly useful in applications such as this.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A fuel level sensor comprising:
a plurality of measurement sensors arranged in a vertical array, each of said measurement sensors including:
a thermal diode; and
a resistor;
a plurality of calibration sensors arranged in a vertical array, each of said calibration sensors including a thermal diode;
a microprocessor; and
wherein each one of said calibration sensors in said plurality is arranged at a vertical position in said vertical array corresponding to a vertical position of one of said measurement sensors;
wherein each of said calibration sensor and said measurement sensor having the same vertical position comprises a sensor pair;
wherein at least one of said measurement sensors in said plurality is arranged at a vertical position in said vertical array not corresponding to a vertical position of one of said calibration sensors;
wherein said microprocessor is programmed so that at least some of said resistors can generate heat and to cool;
wherein said microprocessor is programmed to record the change in temperature of all said thermal diodes in each measurement sensor where one said at least some of said resistors generates heat; and
wherein said microprocessor is programmed to use said changes in temperature to calculate a level of fluid into which said fluid level sensor is at least partially immersed.

2. The fuel level sensor of claim 1, wherein said plurality of measurement sensors includes at least 10 measurement sensors.

3. The fuel level sensor of claim 1, wherein said plurality of measurement sensors includes at least 15 measurement sensors.

4. The fuel level sensor of claim 1, wherein said plurality of measurement sensors includes 17 measurement sensors.

5. The fuel level sensor of claim 1, further comprising a resistor arranged above said vertical array formed from said plurality of said measurement sensors.

6. The fuel level sensor of claim 1 wherein said measurement sensor at a lowest vertical position is part of a sensor pair.

7. The fuel level sensor of claim 1, wherein said plurality of calibration sensors includes at least 3 calibration sensors.

8. The fuel level sensor of claim 7, wherein said plurality of measurement sensors includes 17 measurement sensors.

9. The fuel level sensor of claim 1, wherein each of said measurement sensors in said plurality further comprises an additional resistor.

10. The fuel level sensor of claim 9, wherein said resistor is arranged beside said thermal diode and said additional resistor is arranged below said thermal diode.

11. The fuel level sensor of claim 1, wherein said microprocessor outputs the fuel level in the form of a pulse width modulated wave.

12. The fuel level sensor of claim 11 wherein said pulse width modulated wave goes into a circuit which generates a signal mimicking a variable resistor.

13. The fuel level sensor of claim 1 wherein said measurement sensor at a highest vertical position is part of a sensor pair.

14. The fuel level sensor of claim 13 wherein said measurement sensor at a lowest vertical position is part of a sensor pair.

15. The fuel level sensor of claim 14 wherein a sensor pair is located at a midpoint between said highest and said lowest vertical position.

* * * * *